United States Patent [19]

Matsuo

[11] Patent Number: 5,712,961
[45] Date of Patent: Jan. 27, 1998

[54] CONTACT-TYPE SENSOR

[75] Inventor: Takashi Matsuo, Amagasaki, Japan

[73] Assignee: Minolta Co., Ltd., Osaka, Japan

[21] Appl. No.: 714,363

[22] Filed: Sep. 16, 1996

[30] Foreign Application Priority Data

Sep. 19, 1995 [JP] Japan .................. 7-239545

[51] Int. Cl.⁶ .................................. G05B 15/00
[52] U.S. Cl. .................. 395/93; 33/559; 33/560; 33/561
[58] Field of Search ................. 33/556, 557, 558, 33/559, 560, 561, 572; 395/93; 318/568.16

[56] References Cited

U.S. PATENT DOCUMENTS

| 4,279,080 | 7/1981 | Nakaya | 33/556 |
|---|---|---|---|
| 4,301,338 | 11/1981 | McMurtry | 33/559 |
| 4,330,942 | 5/1982 | Blechmann | 33/556 |
| 4,477,976 | 10/1984 | Suzuki | 33/559 |
| 4,488,019 | 12/1984 | Sakata | 33/559 |
| 4,523,382 | 6/1985 | Werner | 33/556 |
| 4,547,971 | 10/1985 | Imazeki | 33/561 |
| 4,603,482 | 8/1986 | Cusak | 33/559 |
| 4,621,436 | 11/1986 | Kurimoto | 33/561 |
| 4,625,417 | 12/1986 | Cusack | 33/556 |
| 4,912,988 | 4/1990 | Masuhashi | 33/561 |
| 4,941,266 | 7/1990 | Bissegger | 33/556 |
| 4,972,597 | 11/1990 | Kadosaki | 33/556 |
| 5,018,280 | 5/1991 | Enderle | 33/561 |
| 5,029,399 | 7/1991 | McMurtry | 33/559 |
| 5,111,592 | 5/1992 | Aehnelt | 33/558 |
| 5,208,993 | 5/1993 | Harding | 33/558 |
| 5,224,689 | 7/1993 | Georgiev | 267/187 |
| 5,299,360 | 4/1994 | Possati | 33/561 |
| 5,309,592 | 5/1994 | Hiratsuka | 901/1 |
| 5,333,388 | 8/1994 | Butler | 33/556 |
| 5,355,589 | 10/1994 | Madlener | 33/561 |
| 5,509,211 | 4/1996 | Ernst | 33/561 |
| 5,535,861 | 7/1996 | Young | 188/129 |

FOREIGN PATENT DOCUMENTS 5-204448 A  8/1993  Japan .

Primary Examiner—Robert W. Downs
Assistant Examiner—Jeffrey S. Smith
Attorney, Agent, or Firm—Burns, Doane, Swecker & Mathis, LLP

[57] ABSTRACT

A contact type sensor for sensing an object includes a body; and a contacting member which contacts the body and a shaft. One end of the shaft is connected to the body of the sensor and another end of the shaft supports the contacting member. The shaft is rotatable within a predetermined plane, and the shaft is more flexible in a direction perpendicular to the predetermined plane than in a direction parallel to the predetermined plane.

24 Claims, 8 Drawing Sheets 5,712,961

1

CONTACT-TYPE SENSOR

BACKGROUND OF THE INVENTION

1. Field of the Invention

The present invention pertains to a contact-type sensor, specifically, a contact-type sensor provided on a robot which moves along a wall.

2. Description of the Related Art

Automatic moving robots, are conventionally known. Contact-type distance measuring sensors, which are a type of contact-type sensor, are used in such robots in order to detect the distance between the robot and an object.

A contact-type distance measuring sensor comprises a rod-shaped shaft that comes into contact with the object (the object to be measured or an object with which the sensor comes into contact, such as a wall) and a potentiometer that is connected to one end of the shaft.

The shaft moves around an axial shaft of the potentiometer by coming into contact with the object. The angle of movement of the shaft is measured by the potentiometer. The distance between the robot and the wall is calculated based on the angle of movement thus measured.

Contact-type sensors of this type are disclosed in Japanese Laid-Open Patent Application No. Hei 5-204448.

However, the contact-type sensor described above has the following problem.

The above sensor is provide with obstacle detecting bars which protrude from a poll. When a force vertical to a moving direction of one of the obstacle detecting bars may be applied by the contact of the detecting bar and the obstacle, there arises the problem that the detecting bar is damaged due to the force.

SUMMARY OF THE INVENTION

A main object of the present invention is to provide a contact-type sensor which is not damaged easily due to a vertical force applied as a result of a moving direction of the sensor.

Another object of the present invention is to provide a contact-type sensor in which a shaft projecting from the sensor body is prevented from being damaged due to a vertical force applied as a result of a moving direction of the shaft.

As pointed out in greater detail below, the contact-type sensor according to the present invention comprises, a body; a contacting member which contacts the object; and a shaft, one end of which is connected to the body of the sensor, and another end of which supports said contacting member, said shaft being rotatable within a predetermined plane, and the shaft being more flexible in a direction perpendicular to the predetermined plane than in a direction parallel to the predetermined plane.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

2

Figure 1:
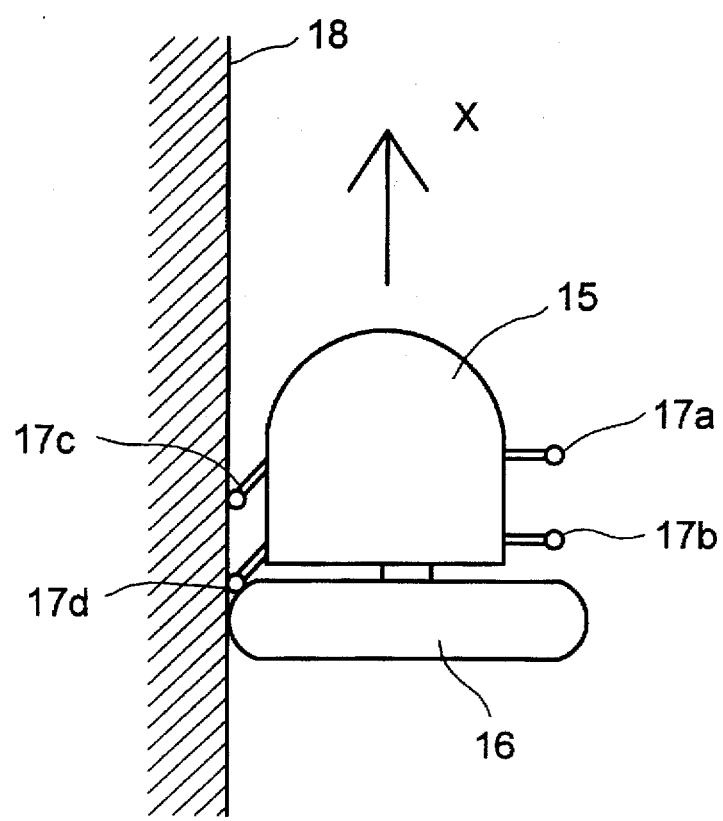
FIG. 1 is a plan view of an automatic moving robot in which the contact-type distance measuring sensor of a first embodiment according to the present invention is used.
Figure 2:
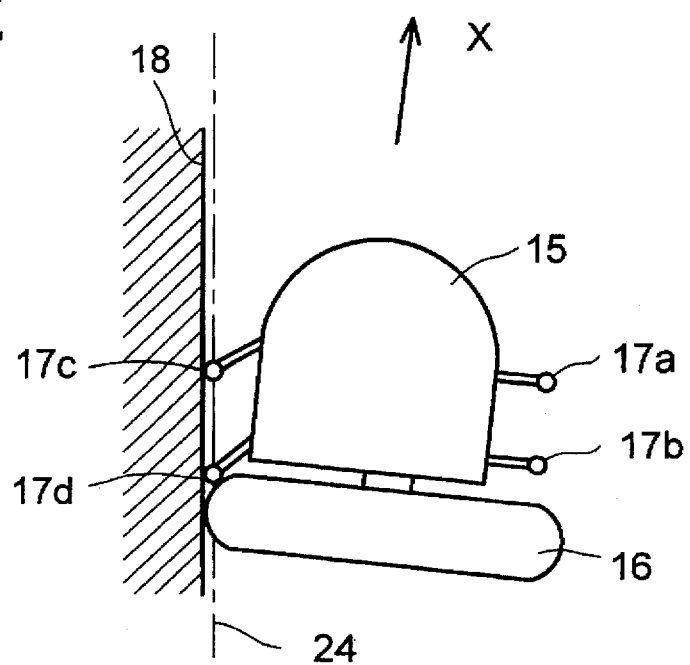

FIG. 2 illustrates the operation of the automatic moving robot as shown in FIG. 1.

Figure 3:
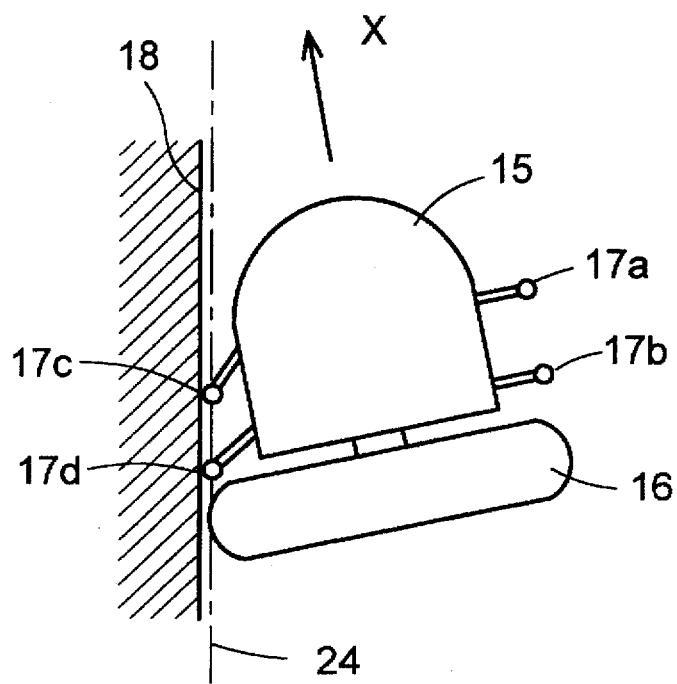

FIG. 3 illustrates the operation of the automatic moving robot as shown in FIG. 1.

Figure 4:
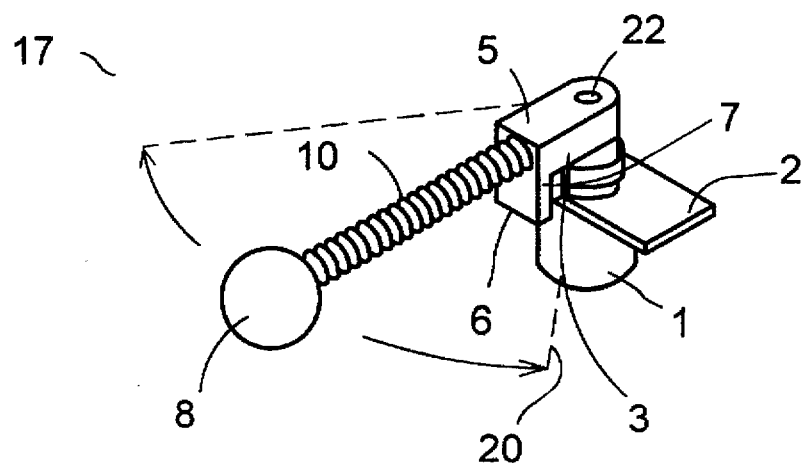

FIG. 4 is a perspective view of a contact-type distance measuring sensor as the first embodiment according to the present invention.

Figure 5:
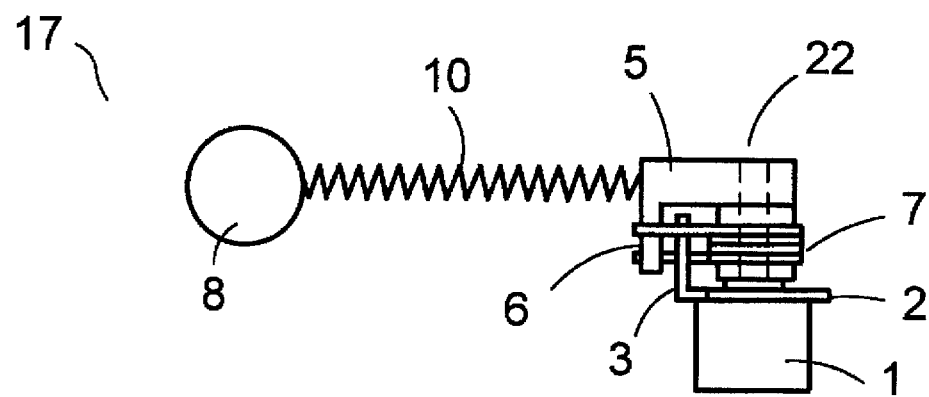

FIG. 5 is a side elevation of the contact-type distance measuring sensor as shown in FIG. 4.

Figure 6:
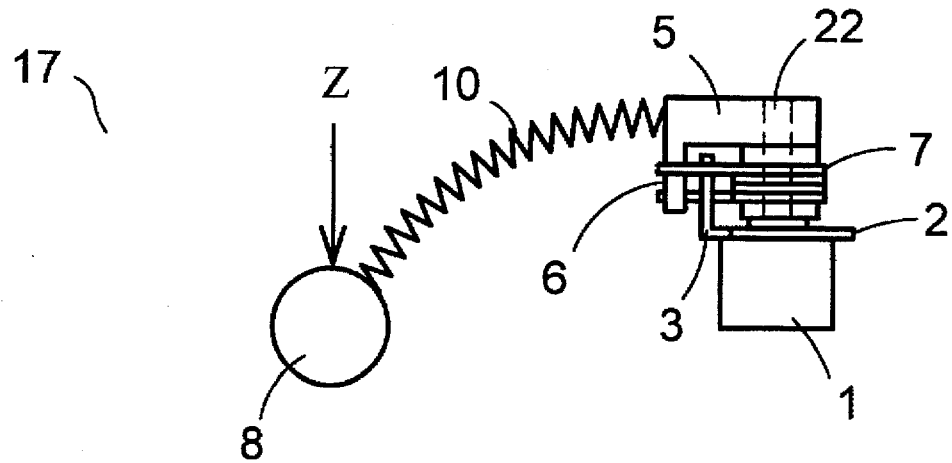

FIG. 6 illustrates the effect of the contact-type distance measuring sensor as shown in FIG. 4.

Figure 7:
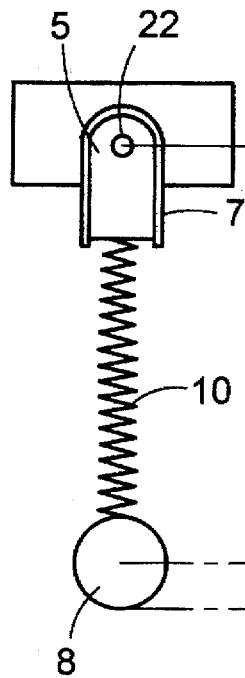
Figure 7:
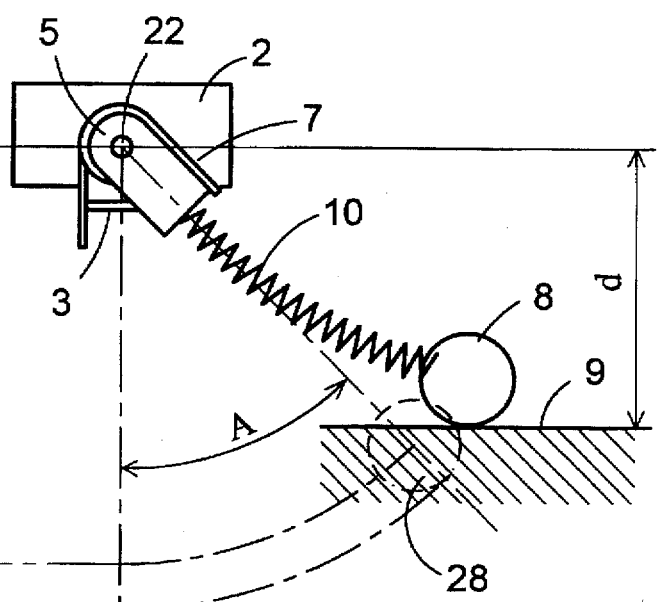

FIG. 7(a) and 7(b) respectively illustrate the features of the contact-type distance measuring sensor as shown in FIG. 4.

Figure 8:
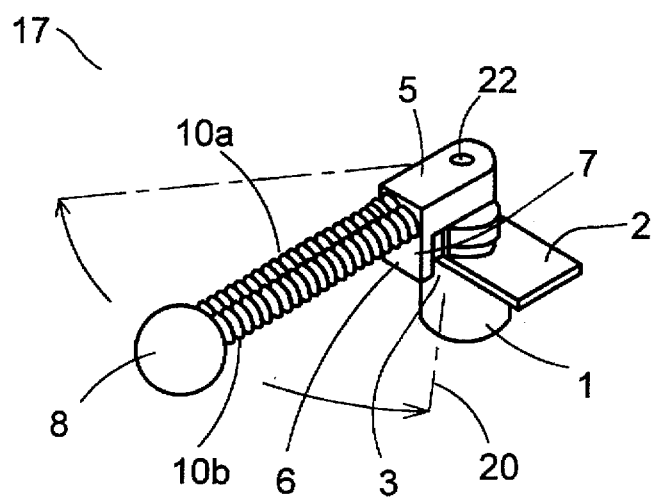

FIG. 8 is a perspective view of a contact-type distance measuring sensor as a second embodiment according to the present invention.

Figure 9:
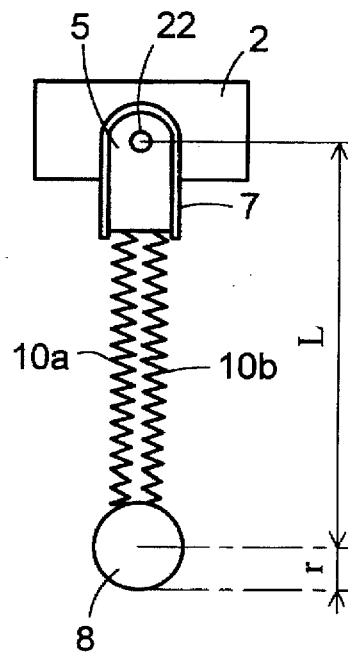
Figure 9:
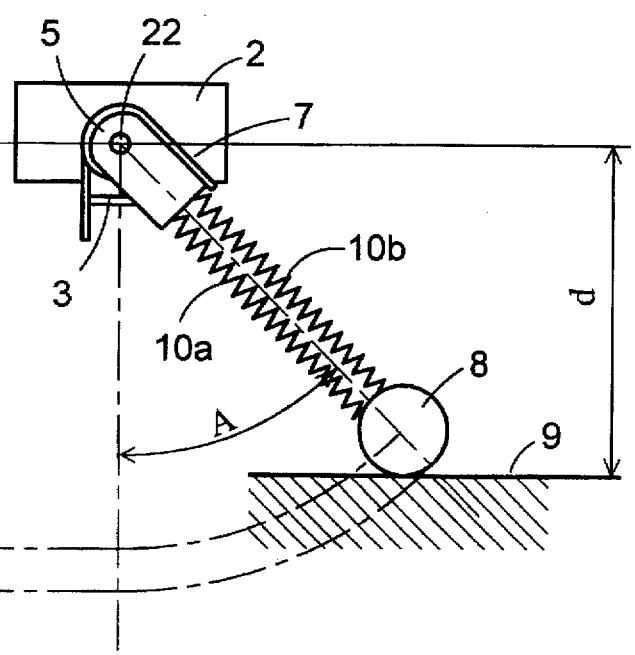

FIG. 9(a) and 9(b) respectively illustrate the features of the contact-type distance measuring sensor as shown in FIG. 8.

Figure 10:
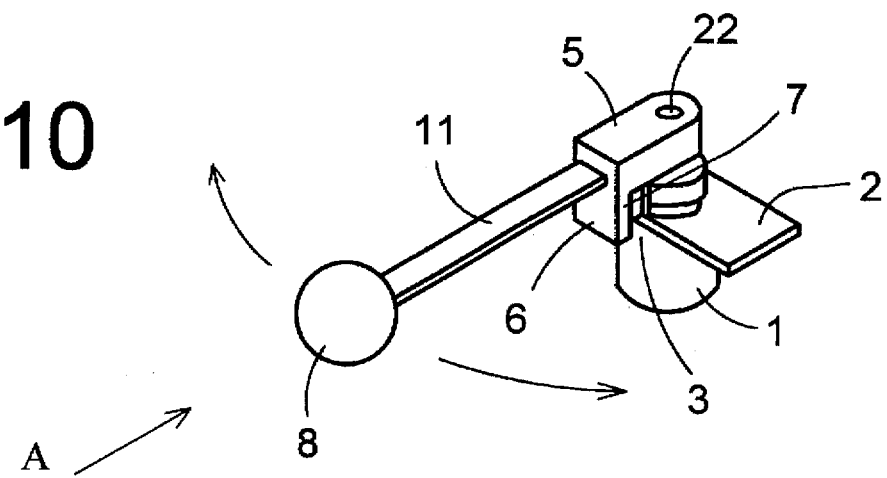

FIG. 10 is a perspective view of a contact-type distance measuring sensor as a third embodiment according to the present invention.

Figure 11:
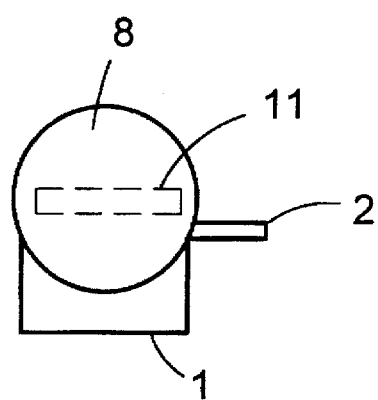

FIG. 11 is a drawing in which the contact-type distance measuring sensor as shown in FIG. 10 is seen from the perspective of A.

Figure 12:
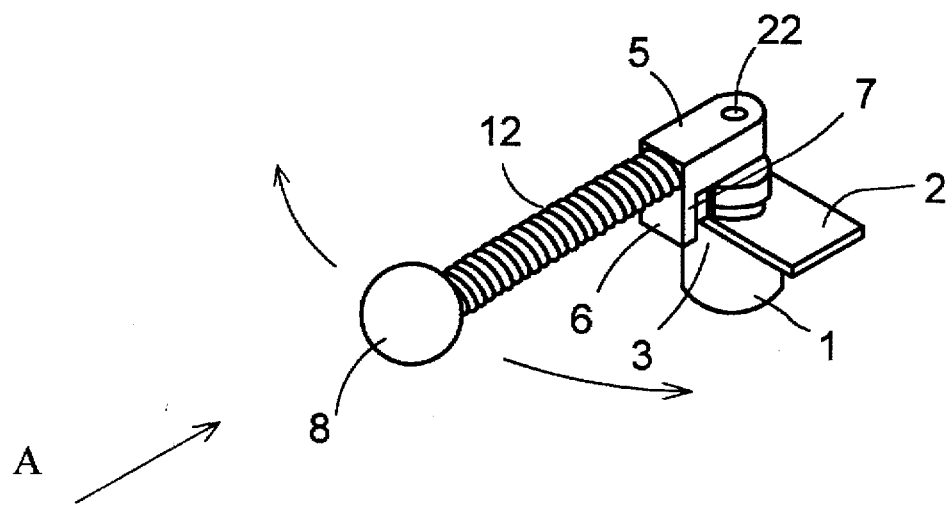

FIG. 12 is a perspective view of a contact-type distance measuring sensor as a fourth embodiment according to the present invention.

Figure 13:
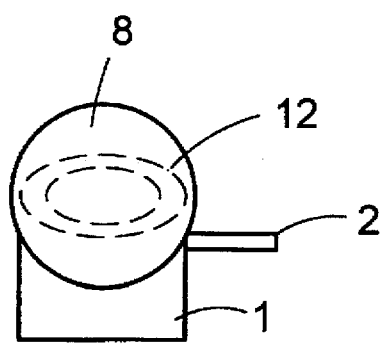

FIG. 13 is a drawing in which the contact-type distance measuring sensor as shown in FIG. 12 is seen from the perspective of A.

Figure 14:
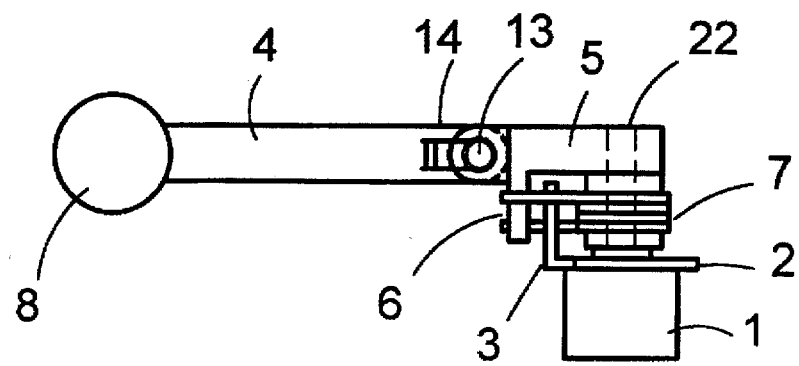

FIG. 14 is a side elevation of a contact-type distance measuring sensor as a fifth embodiment according to the present invention.

Figure 15:
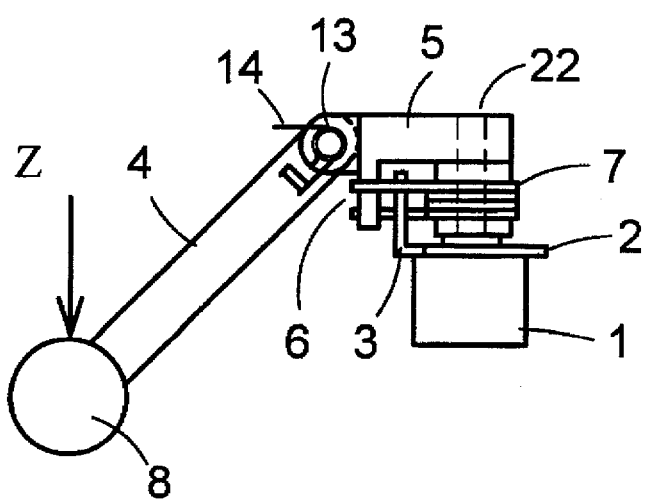

FIG. 15 is a drawing to explain the effect of the contact-type distance measuring sensor shown in FIG. 14.

DETAILED DESCRIPTION OF THE PREFERRED EMBODIMENT

Exemplary embodiments of the present invention are explained below with reference to the attached drawings. In the drawings, the same numbers indicate the same parts or their equivalents.

FIG. 1 is a plan view of an automatic moving robot having contact-type distance measuring sensors according to a first embodiment of the present invention.

As shown in FIG. 1, the automatic moving robot comprises robot main unit 15 which has a drive mechanism and a steering mechanism to drive the robot and a working unit 16 that performs tasks such as cleaning.

To robot main unit 15 are attached contact-type distance measuring sensors 17a through 17d, two of said contact-type distance measuring sensors being attached on each side of said robot main unit 15 along a direction X as shown by an arrow X in which the robot moves.

In FIG. 1, the automatic moving robot is automatically moving in the direction X along the wall 18. In this condition, contact-type distance measuring sensors 17c and 17d are in contact with the wall 18, thereby their shafts are moved in a counterclockwise direction from their neutral positions. The angles of movement of the shafts are detected by potentiometers not shown in the drawings, through which the distance between the robot main unit 15 and the wall 18 is detected. The robot moves along the wall 18 based on the distance thus detected, and is controlled so that the working unit 16 is in contact with the wall 18.

The automatic moving robot shown in FIG. 1 is controlled so as to perform the operations described below in order to carry out tasks such as cleaning the floor to the edge of the wall.

As shown in FIGS. 2 and 3, the robot is controlled such that the end of the working unit 16 is aligned along a line 24 extending from the two distance measuring sensors 17c and 17d at all times. Consequently, regardless of whether the robot moves away from the wall (FIG. 2) or approaches the wall (FIG. 3), the floor can be cleaned to the edge of the wall 18 at all times.

This is performed through the measurement by the potentiometers of the angles of movement of the shafts of the contact-type distance measuring sensor 17c and the contact-type distance measuring sensor 17d.

On the other hand, as shown in FIG. 3, when the automatic moving robot approaches the wall in direction X', the robot is controlled such that the end of the working unit 16 may be aligned along straight line 24 connecting the contacts of contact-type distance measuring sensor 17c and contact-type distance measuring sensor 17d.

FIG. 4 is a perspective view of a specific embodiment of contact-type distance measuring sensors 17a through 17d shown in FIG. 1, and FIG. 5 is a side elevation of the same construction.

As shown in FIGS. 4 and 5, the contact-type distance measuring sensor 17 comprises a contacting member 8 that comes into contact with an object such as a wall, a shaft 10 that is connected to the contacting member 8 at one end, a potentiometer 1 that detects the angle of movement of shaft 10, a shaft holder 5 that connects the rotational shaft of the potentiometer 1 and the shaft 10, a sensor base 2 that is connected to potentiometer 1 and is used to attach the contact-type distance measuring sensor 17 to a robot, a base claw 3 that is formed integrally with the sensor base 2, a shaft center position determining claw 6 that is formed integrally with the shaft holder 5, and helical coil spring 7 that gives force to the shaft in the direction of its neutral position by sandwiching the base claw 3 and shaft center position determining claw 6 by means of two arms extending from either side of the spring.

Shaft 10 can freely move in a clockwise direction and a counterclockwise direction at a predetermined angle around a rotational shaft 22 of the potentiometer 1. By means of this construction, shaft 10 can freely move within a predetermined plane 20 indicated by dotted lines in FIG. 4.

Shaft 10 moves within the predetermined plane 20 by means of an object coming into contact with the shaft 10 or contacting member 8. When the object is no longer in contact with the contacting member 8 or shaft 10, shaft 10 returns to the neutral position by means of the force given by helical coil spring 7.

FIG. 7(a) is a plan view to explain the operation of the contact-type distance measuring sensor as shown in FIG. 4.

FIG. 7(a) shows shaft 10 in the neutral condition. FIG. 7(b) shows that shaft 10 is moved within the predetermined plane 20 because the contacting member 8 comes into contact with an object 9.

Starting in the condition shown in FIG. 7(a), when object 9 comes into contact with contacting member 8, shaft 10 moves around the rotational shaft 22, as shown in FIG. 7(b). In the condition shown in FIG. 7(b), the shaft 10 is given force by helical coil spring 7 via shaft holder 5 that forces shaft 10 to move in the clockwise direction around rotational shaft 22. If the angle at which shaft 10 is moved from the neutral condition (angle of movement) is A, the length of shaft 10 is L and the radius of the contacting member 8 is r, the distance d between the rotational shaft 22 of the potentiometer and the object 9 (the object to be measured) is expressed by means of the following equation (1).

$$d = r + L \times \cos A \tag{1}$$

The distance between the contact-type distance measuring sensor and the object is calculated using this equation.

In FIG. 7(b), although shaft 10 is rotating counterclockwise from the condition shown in FIG. 7(a), it is also possible for shaft 10 to move clockwise.

It is to be noted here that the contacting member 8 is actually located at a position beyond angle A due to the elasticity of spring 10 even if the angle detected by potentiometer 1 is A. In other words, in FIG. 7(b), based on angle A measured by the potentiometer of the contact-type distance measuring sensor, the location of the contacting member 8 is determined to be the position indicated by one-dot line. However, the contacting member 8 is actually located at the position indicated by a solid line.

However, the deviation in the detected position of the contacting member 8 does not affect adversely the detection by the contact-type distance measuring sensor because the deviation is not great.

In the contact-type distance measuring sensor shown in FIG. 4, the shaft comprises a spring 10 which is an elastic member.

As shown in FIG. 6, when the force Z parallel to the rotational shaft 22 of potentiometer 1 is applied to the contacting member 8 and the shaft 10 comprising a spring, the shaft 10 is deformed in a direction of the application of the force, and therefore the shaft 10 and the connecting area between shaft 10 and potentiometer 1 are prevented from being damaged.

In order to easily absorb the force by the flexibility or elasticity of shaft 10, it is preferable that the shaft has enough elasticity to be bent when a vertical force is applied to the shaft 10 for preventing the shaft 10 from being damaged. Further, the flexibility of the shaft 10 is preferably larger in a vertical direction than in the horizontal rotational direction so that the shaft 10 is not substantially bent when a horizontal force is applied to the shaft 10.

In addition, it is preferable that the rigidity of the shaft 10 is sufficient to prevent the shaft 10 from being substantially bent when a horizontal force is applied to the shaft 10. Thus, it is preferable that the rigidity of the shaft 10 is sufficient to prevent the shaft 10 from being substantially bent when a horizontal rotational torque is applied to the shaft 22 by the helical coil spring 7.

If the shaft 10 is too flexible, the shaft would droop downward and would be easily deformed in a horizontal direction. Conversely, if the shaft is not flexible enough, the shaft 10 would be too hard to deform when a vertical force was applied to the shaft.

FIG. 8 is a perspective view of a second embodiment of a contact-type distance measuring sensor according to the present invention.

The construction of the contact-type distance measuring sensor of the second embodiment is identical to that of the contact-type distance measuring sensor of the first embodiment except for the shaft. In the contact-type distance measuring sensor as the second embodiment, the shaft comprises two springs 10a and 10b that are aligned parallel to a predetermined plane 20 within which the shaft moves.

In the contact-type distance measuring sensor of the second embodiment, when a force Z vertical to the plane 20 within which the shaft moves is applied to the shaft or the contacting member 8, the shaft is deformed due to the elasticity of springs 10a and 10b, and therefore the shaft and the connecting area between the shaft and the potentiometer are prevented from being damaged.

It is preferable that springs 10a and 10b have elasticity enough to absorb the force Z in a direction vertical to the plane 20 within which the shaft moves.

FIG. 9(a) and (9b) are respectively plan views of the contact-type distance measuring sensor as the second embodiment according to the present invention.

When shaft springs 10a and 10b are moved at angle A in the counterclockwise direction from the neutral condition shown in FIG. 9(a) by means of object 9 coming into contact with contacting member 8, the contact-type distance measuring sensor comes into the condition shown in FIG. 9(b). In this condition, because the two springs 10a and 10b are aligned parallel to the plane 20 within which the shaft moves, springs 10a and 10b are not easily bent in the directions of the movement of the shaft.

As a result, the deviation in the detected position of the contacting member 8 can be reduced more effectively with this construction, and therefore more accurate distance measurement can be performed in this embodiment. On the other hand, when the force Z vertical to the direction of the movement of the shaft is applied to the shaft or the contacting member 8, damage of the sensor itself can be prevented in approximately the same manner as when one spring is used as the shaft.

FIG. 10 is a perspective view of a contact-type distance measuring sensor as a third embodiment according to the present invention. FIG. 11 is a plan view in which FIG. 10 is seen from the viewpoint of A.

With reference to the drawings, the basic construction of the contact-type distance measuring sensor of this embodiment is the same as that of the contact-type distance measuring sensor shown in FIGS. 4 and 8.

The construction of the contact-type distance measuring sensor of the third embodiment is identical to that of the contact-type distance measuring sensor of the first embodiment except for the shaft. In the contact-type distance measuring sensor of the third embodiment, plate spring 11 is used for the shaft. The plate spring is attached to the shaft holder such that it is easily bent in the direction vertical to the plane 20 within which the shaft moves. More specifically, as shown in FIG. 11, plate spring 11 is attached such that its main surface may be parallel to the plane 20 within which the shaft moves.

By this construction, the plate spring is not easily deformed in the direction of the movement of the shaft while it is easily deformed in the direction vertical to the plane 20 within which the shaft moves. Therefore, when the force Z vertical to the direction of the movement of the shaft is applied to the shaft or the contacting member, the plate spring is bent due to its elasticity in the same way as the contact-type distance measuring sensor of the second embodiment of the present invention described above, as a result of which unnecessary force is absorbed.

On the other hand, because the plate spring is not deformed in the direction of the movement of the shaft, no deviation in the detected position of the contacting member 8 occurs, allowing for accurate distance measurement.

FIG. 12 is a perspective view of a contact-type distance measuring sensor of fourth embodiment of the present invention. FIG. 13 is a drawing in which FIG. 12 is seen from the perspective of A.

The construction of the contact-type distance measuring sensor of the fourth embodiment is identical to that of the contact-type distance measuring sensor of the first embodiment except for the shaft. In the contact-type distance measuring sensor of the fourth embodiment, the shaft comprises a coil spring 12 whose spiral configuration is oval. Oval coil springs have the characteristic that they are not easily bent in the directions along their longer diameter while they are easily bent in the directions along their shorter diameter. Therefore, by placing the coil spring such that the longer diameter is parallel to the direction of the movement of the shaft, as shown in FIG. 13, a sensor in which deviation in the detected position of the contacting member 8 and damage are reduced can be provided as in the case of the contact-type distance measuring sensors as the second and third embodiments.

FIG. 14 is a side elevation showing a specific construction of a contact-type distance measuring sensor of a fifth embodiment of the present invention.

The construction of the contact-type distance measuring sensor of the fifth embodiment is identical to that of the contact-type distance measuring sensor of the first embodiment except for the shaft. In the contact-type distance measuring sensor as the fifth embodiment, a joint member is used between shaft 4 and shaft holder 5.

This joint member comprises fulcrum 13 and position determining coil spring 14. In other words, shaft 4 and shaft holder 5 can move relative to each other around fulcrum 13. Position determining coil spring 14 normally gives force to shaft 4 and shaft holder 5 such that shaft holder 5 and shaft 4 are aligned in a straight line (the neutral condition).

For example, when the force Z vertical to the plane 20 within which the shaft of the contact-type distance measuring sensor of this embodiment moves is applied to the contact as shown in FIG. 15, shaft 4 and shaft holder 5 move relative to each other around fulcrum 13. By this construction, shaft 4 and the connecting area between shaft 4 and potentiometer 1 are prevented from being damaged.

When the force Z vertical to the plane 20 within which the shaft moves is eliminated, shaft 4 and shaft holder 5 return to the neutral positional relationship shown in FIG. 14, due to the force of spring 14.

In FIG. 15, downward force Z is assumed as the force applied to contacting member 8, however when a force in the reverse direction is applied to contacting member 8, shaft 4 moves clockwise around fulcrum 13 and the sensor is prevented from being damaged.

In the fifth embodiment, the contact-type distance measuring sensor is easily bent in the direction vertical to the plane within which the shaft moves, but is not easily bent in the direction of the movement of the shaft, thereby the shear in the detected position of the contacting member can be sufficiently reduced and the sensor is prevented from being damaged.

While the present invention has been explained referring to contact-type distance measuring sensors in the first through fifth embodiments described above, as long as the sensor is contact-type, such as an obstacle detecting sensor that comes into contact with an object, the present invention can be applied in connection with such a sensor.

Although the present invention has been fully described byway of examples with reference to the accompanying drawings, it is to be noted that various changes and modifications will be apparent to those skilled in the art. Therefore, unless otherwise such changes and modifications depart from the scope of the present invention, they should be construed as being included therein.

I claim: claims:

1. A contact-type sensor for sensing an object, comprising:
   a body;
   a contacting member which contacts the object; and
   a shaft, one end of which is connected to the body of the sensor, and another end of which supports said contacting member, said shaft being rotatable within a predetermined plane, and the shaft being more flexible in a direction perpendicular to the predetermined plane than in a direction parallel to the predetermined plane.

2. The sensor as claimed in claim 1, wherein said shaft has sufficient rigidity so that it is not substantially bent when a rotational torque is applied to the shaft.

3. The sensor as claimed in claim 1, further comprising a degree detecting member which detects a degree of rotation of the shaft when the contacting member contacts the object.

4. The sensor as claimed in claim 3, further comprising means for determining a distance between the body of the sensor and the object based upon the degree of rotation of the shaft.

5. The sensor as claimed in claim 1, wherein the shaft includes at least one spring.

6. The sensor as claimed in claim 1, wherein the shaft includes a plate spring.

7. The sensor as claimed in claim 1, wherein the shaft includes a coil spring having an oval cross section.

8. The sensor as claimed in claim 1, wherein the one end of the shaft is connected to the body of the sensor through a joint member which includes a fulcrum and coil spring.

9. A robot movable in a predetermined direction, comprising:
   a body of the robot;
   at least one sensor provided on a side of the body of the robot; and
   at least one shaft connecting said sensor to the body of the robot, said shaft being movable with in a predetermined plane, and a flexibility of the shaft in a direction perpendicular to the predetermined plane is greater than a flexibility of the shaft in a direction parallel to the predetermined plane.

10. The robot as claimed in claim 9, wherein said shaft has sufficient rigidity so that it is not substantially bent when a rotational torque is applied to the shaft.

11. The robot as claimed in claim 9, further comprising a degree detecting member which detects a degree of rotation of the shaft when the sensor contacts an object.

12. The robot as claimed in claim 11, further comprising means for determining a distance between the body of the robot and the object based upon the degree of rotation of the shaft.

13. The robot as claimed in claim 9, further comprising a working unit including a cleaning member which cleans a floor.

14. A contact-type sensor, comprising:
    a body;
    a shaft projecting from the body of the sensor and said shaft being more flexible in a vertical direction than in a horizontal direction; and
    a contacting member provided at a free end of said shaft and which contacts with an object.

15. The contact-type sensor as claimed in claim 14, wherein said shaft is rotatable within the horizontal direction.

16. The contact-type sensor as claimed in claim 15, further comprising a degree detecting member which detects a degree of rotation of the shaft.

17. The contact-type sensor as claimed in claim 16, further comprising means for determining a distance between the body of the sensor and the object based upon the degree of rotation of the shaft.

18. A method of using a sensor having a contacting member, comprising the steps of:
    bringing said contacting member into contact with an object while rotating the contacting member within a rotational plane; and
    moving the contacting member only in a direction perpendicular to the rotational plane of the contacting member when a force perpendicular to the rotational plane of the contacting member is applied to the contacting member.

19. The sensor as claimed in claim 1, wherein the shaft is sufficiently stiff to solely support said contacting member.

20. The sensor as claimed in claim 1, wherein the shaft is elastic.

21. The sensor as claimed in claim 1, wherein the contacting member is more easily deflected in the direction perpendicular to the predetermined plane than in the predetermined plane.

22. A contact type sensor for sensing an object, comprising:
    a body;
    a contacting member for contacting an object; and
    an elastic shaft, the shaft having one end connected to the body and another end connected to the contacting member, the shaft being more elastic in a vertical direction than in a horizontal direction.

23. The sensor as claimed in claim 22, wherein the shaft is rotatable in said horizontal direction.

24. The sensor as claimed in claim 22, wherein the shaft is sufficiently stiff to solely support said contacting member.

* * * * *